US012307955B1

(12) United States Patent
Dai et al.

(10) Patent No.: US 12,307,955 B1
(45) Date of Patent: May 20, 2025

(54) DISPLAY SYSTEM, POWER MANAGEMENT CIRCUIT AND RELATED OPERATION METHOD

(71) Applicant: AUO Corporation, Hsin-Chu (TW)

(72) Inventors: Yi-Yo Dai, Hsin-Chu (TW); Wei-Jen Chen, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/751,405

(22) Filed: Jun. 24, 2024

(30) Foreign Application Priority Data

Dec. 20, 2023 (TW) ................................ 112149738

(51) Int. Cl.
*G09G 3/32* (2016.01)

(52) U.S. Cl.
CPC ......... *G09G 3/32* (2013.01); *G09G 2330/021* (2013.01)

(58) Field of Classification Search
CPC .......................... G09G 3/32; G09G 2330/021
See application file for complete search history.

(56) References Cited

U.S. PATENT DOCUMENTS 6,345,364 B1 * 2/2002 Lee ...................... G06F 1/3265 713/324
2009/0213101 A1 8/2009 Murase et al.
2009/0278830 A1 * 11/2009 Onishi ................... G09G 5/003 345/211
2016/0078818 A1 * 3/2016 Kang .................. G09G 3/3291 323/280
2016/0133185 A1 5/2016 Yoon et al.
2017/0294162 A1 10/2017 Hu et al.
2018/0315374 A1 11/2018 Zhang et al.
2020/0286432 A1 9/2020 Zhang et al.
2021/0174746 A1 6/2021 Zhang et al.
2021/0350763 A1 * 11/2021 Okamura .............. G06F 3/0412
2022/0157248 A1 5/2022 Zhang et al.
2022/0375409 A9 11/2022 Zhang et al.
2023/0215372 A1 7/2023 Zhang et al.
2024/0105125 A1 * 3/2024 Kim ..................... G09G 3/3688

* cited by examiner

*Primary Examiner* — Muhammad N Edun
(74) *Attorney, Agent, or Firm* — WPAT, PC

(57) ABSTRACT

A display system includes a display panel, a display driving circuit and a power management circuit. Display panel includes a plurality of pixel circuits. Display driving circuit is coupled to the display panel and configured to periodical signals and a data signal to the display panel. Data signal is configured to assign a gray level to each of the pixel circuits. Power management circuit is coupled to the display driving circuit and the display panel and is configured to provide a first operating voltage and a second operating voltage to the pixel circuits. The first operating voltage is higher than the second operating voltage. Display driving circuit is configured to provide a first horizontal synchronizing signal to the power management circuit. Power management circuit is configured to adjust at least one of the first operating voltage and the second operating voltage in response to the first horizontal synchronizing signal.

16 Claims, 6 Drawing Sheets

200

DISPLAY SYSTEM, POWER MANAGEMENT CIRCUIT AND RELATED OPERATION METHOD

CROSS-REFERENCE TO RELATED APPLICATION

This application claims priority to Taiwan Application Serial Number 112149738, filed Dec. 20, 2023, which is herein incorporated by reference in its entirety.

BACKGROUND

Field of Invention

The present disclosure relates to a display technology. More particularly, the present disclosure relates to a display system, a power management circuit and an operation method.

Description of Related Art

Compared with liquid crystal displays, mirco-light emitting diode (micro LED) displays have advantages of low power consumption, high color saturation and high response speed. Mirco-light emitting diode displays are regarded as one of popular technologies for the next generation of mainstream display products.

An operation of a mirco-light emitting diode pixel circuit includes three stages: a reset stage, a compensation stage and a light-emitting stage. In conventional technology, during the reset stage, a leakage current path will be formed in a pixel circuit, resulting in increased power consumption. In addition, during the compensation stage, it takes a while to charge a gate terminal of a driving transistor to a target voltage, causing a bottleneck in increasing an update rate of a frame.

SUMMARY

One aspect of the present disclosure provides a display system, which includes a display panel, a display driving circuit and a power management circuit. The display panel includes a plurality of pixel circuits. The display driving circuit is coupled to the display panel, and is configured to receive a first horizontal synchronizing signal. The display driving circuit is configured to transmit a data signal to the display panel according to the first horizontal synchronizing signal. The data signal is configured to assign a grayscale value to each of the pixel circuits. The power management circuit is coupled to the display driving circuit and the display panel, and is configured to provide a first operating voltage and a second operating voltage to the pixel circuits, which the first operating voltage is higher than the second operating voltage. The display driving circuit is configured to transmit the first horizontal synchronizing signal to the power management circuit. The power management circuit is configured to adjust at least one of the first operating voltage and the second operating voltage in response to the first horizontal synchronizing signal.

Another aspect of the present disclosure provides a power management circuit, which is configure to couple to a display panel and a display driving circuit, and is configured to provide a first operating voltage and a second operating voltage to the pixel circuits of the display panel, wherein the first operating voltage is higher the second operating voltage. The power management circuit is further used for:

receiving a first horizontal synchronizing signal from the display driving circuit, wherein the display driving circuit is configured to transmit a data signal to the display panel according to the first horizontal synchronizing signal, which the data signals configured to assign a grayscale value to each of the pixel circuits; and adjusting at least one of the first operating voltage and the second operating voltage in response to the first horizontal synchronizing signal.

Another aspect of the present disclosure provides an operating method, which is adapted for a power management circuit. The power management circuit is configured to couple to a display panel and a display driving circuit, and is configured to provide a first operating voltage and a second operating voltage to a plurality of pixel circuits of the display panel, which the first operating voltage is higher than the second operating voltage, wherein the operating method includes following steps of: receiving a first horizontal synchronizing signal from the display driving circuit, wherein the display driving circuit is configured to transmit the first horizontal synchronizing signal to the display panel; and adjusting at least one of the first operating voltage and the second operating voltage in response to the first horizontal synchronizing signal.

Part of advantages of the aforementioned display system, the power management circuit and the operating method are to save power consumption and improve a refresh rate of a frame.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
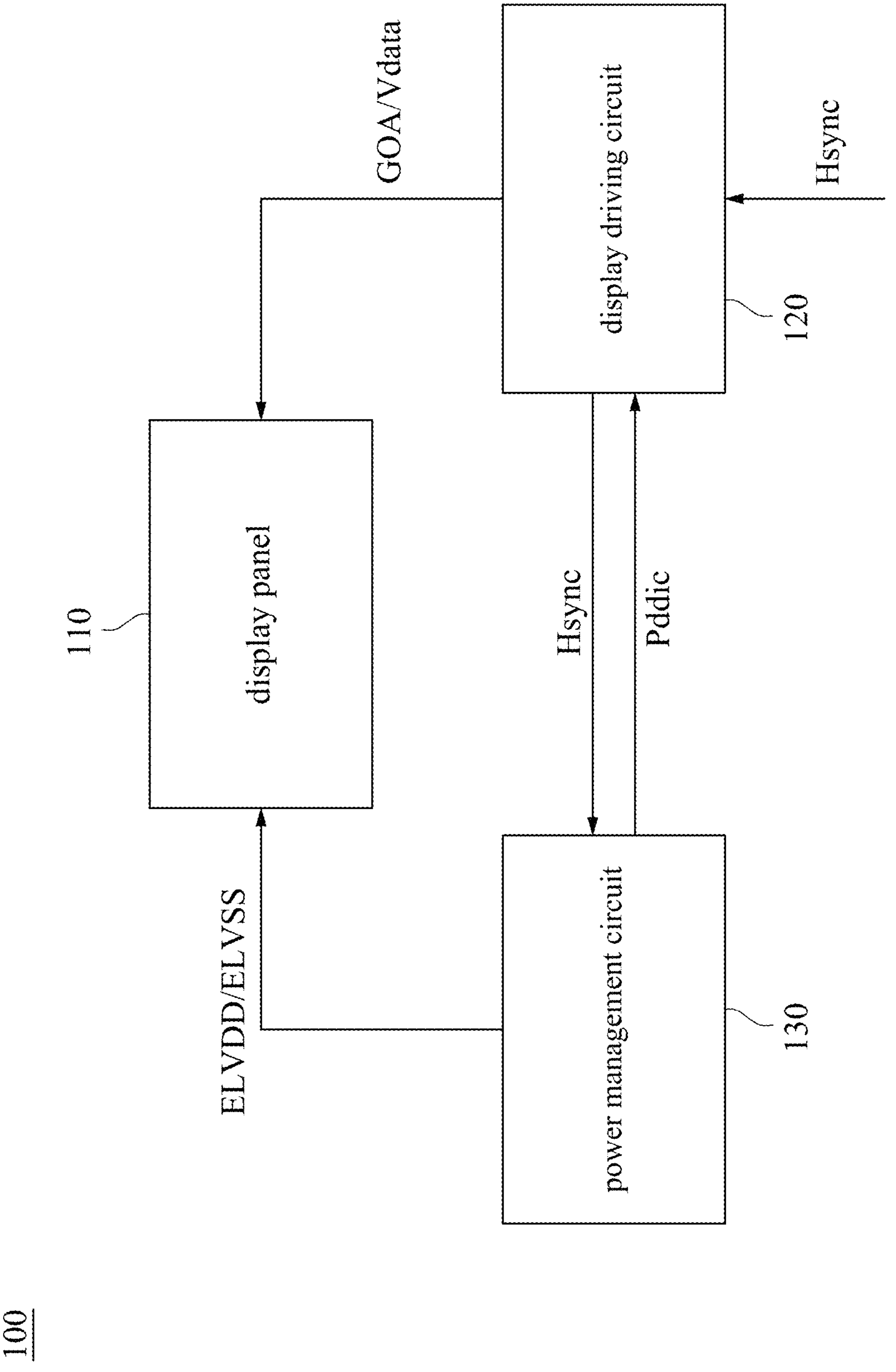
FIG. 1 depicts a simplified schematic diagram of a display system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, “comprising”, “including”, “having”, “containing”, “involving” and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a simplified schematic diagram of a display system 100 according to some embodiments of the present disclosure. The display system 100 includes a display panel 110, a display driving circuit 120 and a power management circuit 130. The display panel 110 includes a plurality of pixel circuits 200 (shown in FIG. 2), which the pixel circuits 200 are arranged in a pixel matrix having a plurality of columns and a plurality of rows. The display driving circuit 120 is coupled to the display panel 110, is configured to receive a first horizontal synchronizing signal Hsync from an external video source (for example, a display card), and is configured to provide a gate control signal GOA, a data signal Vdata and other driving signals to the display panel 110 according to the first horizontal synchronizing signal Hsync, which the data signal Vdata is configured to assign a grayscale value to be displayed by each of the pixel circuits pixel circuit 200. Therefore, the display driving circuit 120 is configured to determine a time point when each of plurality of columns in the pixel matrix starts updating according to a pulse wave of the first horizontal synchronizing signal Hsync.

The power management circuit 130 is coupled between the display driving circuit 120 and the display panel 110, and is configured to provide a first operating voltage ELVDD and a second operating voltage ELVSS to each of the pixel circuits 200, which the first operating voltage ELVDD is higher than the second operating voltage ELVSS. The power management circuit 130 is configured to provide an output power Pddic to the display driving circuit 120. The power management circuit 130 is further configured to receive the first horizontal synchronizing signal Hsync from the display driving circuit 120. The power management circuit 130 is configured to adjust at least one of the first operating voltage ELVDD and the second operating voltage ELVSS in response to the first horizontal synchronizing signal Hsync. Detail adjustment method will be described with FIGS. 3-6.

Figure 2:
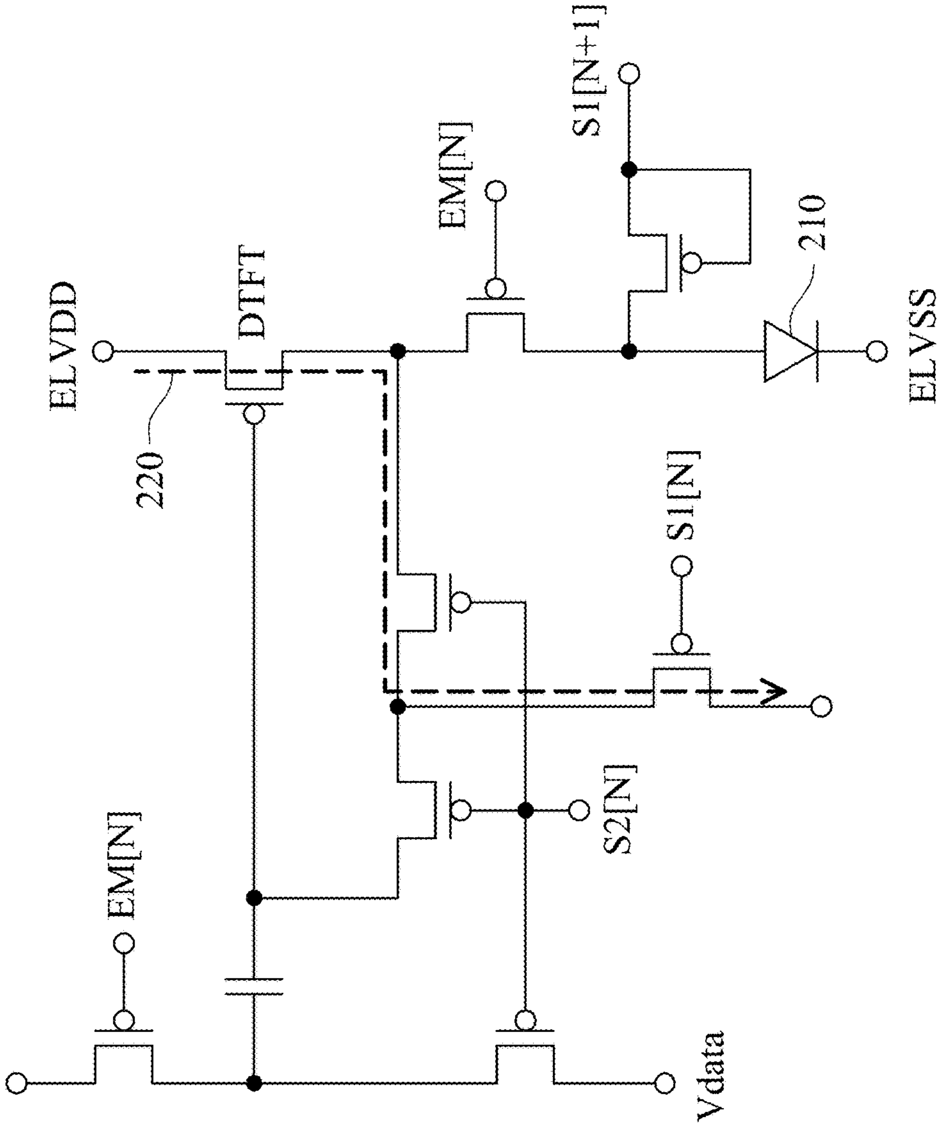
FIG. 2 depicts a schematic diagram of a pixel circuit according to some embodiments of the present disclosure.

Please refer to FIG. 2, FIG. 2 depicts a schematic diagram of the pixel circuit 200 embodiments of the present disclosure. The pixel circuit 200 includes a light emitting element 210 and a plurality of transistors, which the transistors include a driving transistor DTFT. In some embodiments, the transistors are P-type transistors. Two terminals of a series circuit structure formed by the driving transistor DTFT and the light emitting element 210 are respectively configured to receive the first operating voltage ELVDD and the second operating voltage ELVSS. When the driving transistor DTFT is configured to operate in a saturation region, the driving transistor DTFT is configured to generate a current to drive the light emitting element 210, where a magnitude of the current is related to the data signal Vdata. The pixel circuit 200 is configured to receive control signals S1, S2 and EM. An index after a number of each of the control signals is configured to represent a column in the pixel matrix corresponding to the control signal. For example, a control signal S1 [N] represents the control signal S1 corresponding to a Nth column. A control signal S1[N+1] represents the control signal S1 corresponding to a N+1th column. Pulse waves of the control signals S1 [N] and S1 [N+1] are arranged sequentially in a time sequence.

An operation of the pixel circuit 200 in each frame includes but is not limited to a reset stage, a compensation stage and a light-emitting stage. The display panel 110 is configured to reset voltages of one or more internal nodes corresponding to each of the pixel circuits 200 (for example, a column of the pixel matrix) at the reset stage. However, in some embodiments, during the reset stage, a leakage current path 220 may be formed inside each of the pixel circuit 200, resulting in increased power consumption. In addition, during the compensation stage, the display panel 110 is configured to control the plurality of corresponding pixel circuits (for example, a column of the pixel matrix) to detect a threshold voltage of the driving transistor DTFT. In order to detect the threshold voltage of the driving transistor DTFT, each of the pixel circuits 200 is configured to charge a gate terminal of the driving transistor DTFT until the driving transistor DTFT is close to be turned off so that a voltage of the gate terminal of the driving transistor DTFT can reflect the threshold voltage of the driving transistor DTFT. However, a length of the compensation stage may not be long enough for each of the pixel circuits 200 to complete aforementioned charging procedure. Therefore, the present disclosure provides an operation method of the power management circuit 130 to solve these problems.

Figure 3:
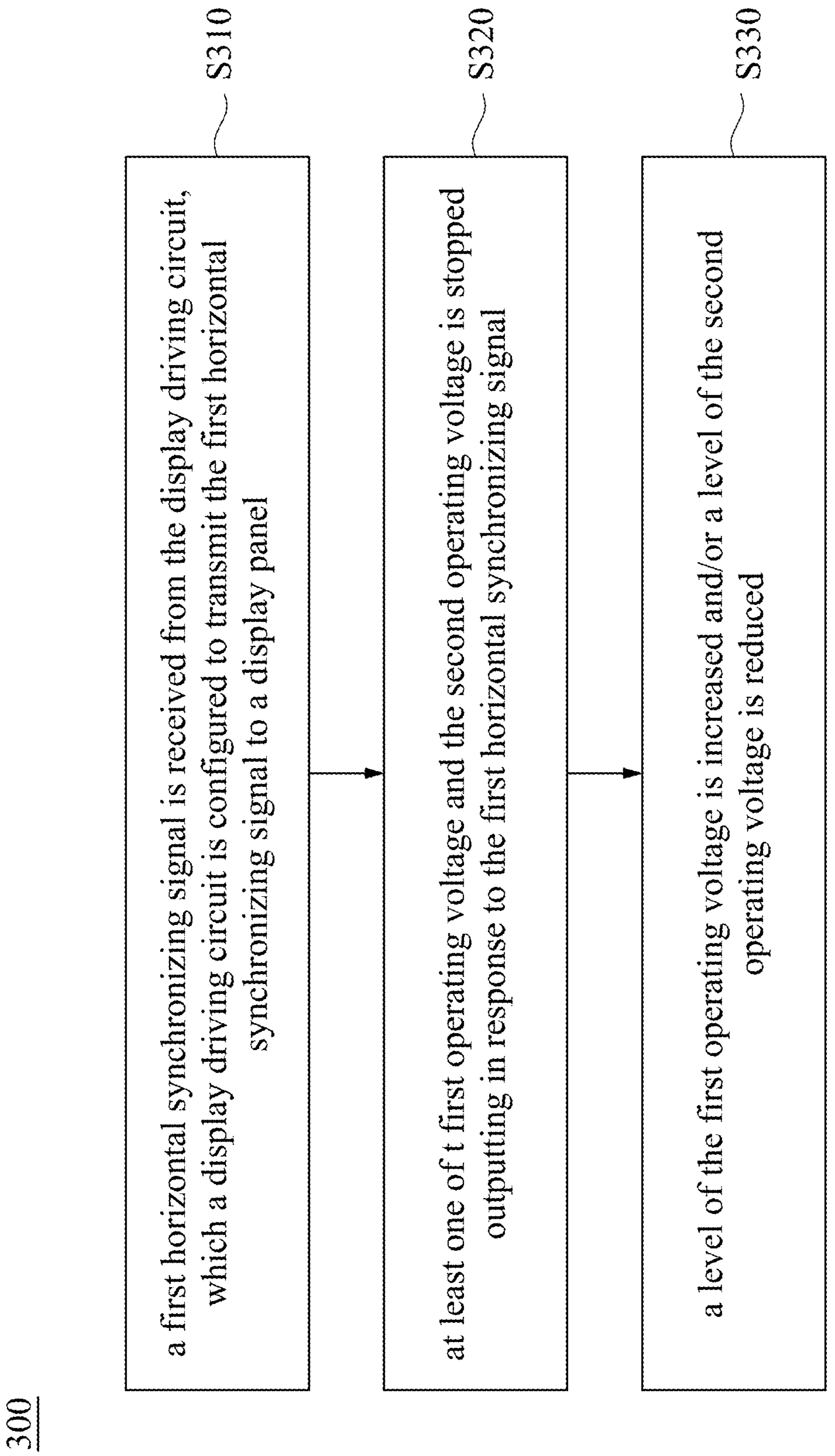
FIG. 3 depicts a flow chart of an operating method for operating a power management circuit according to one embodiment of the present disclosure.

Please refer to FIG. 3, FIG. 3 depicts a flow chart of an operating method 300 for operating a power management circuit 130 according to one embodiment of the present disclosure. In step S310, the power management circuit 130 is configured to receive the first horizontal synchronizing signal Hsync from the display driving circuit 120. Then, in step S320, in response to the first horizontal synchronizing signal Hsync, during the reset stage, the power management circuit 130 is configured to stop outputting the at least one of t first operating voltage ELVDD and the second operating voltage ELVSS. Furthermore, in step S330, in response to the first horizontal synchronizing signal Hsync, during the compensation stage, the power management circuit 130 is configured to increase a level of the first operating voltage ELVDD and/or reduce a level of the second operating voltage ELVSS.

Figure 4:
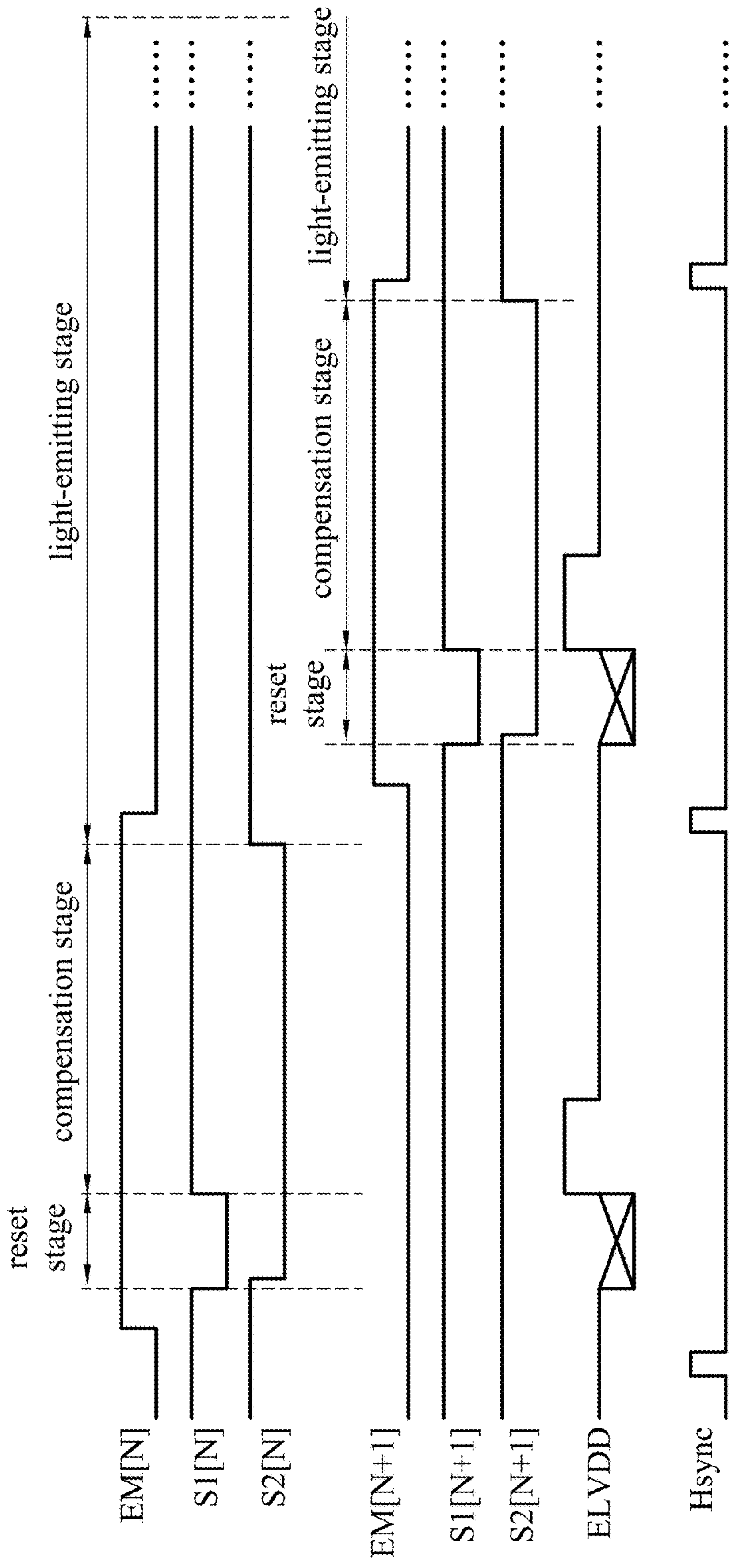
FIG. 4 depicts a schematic diagram of control signal waveforms of a power management circuit according to one embodiment of the present disclosure.

Steps S320 to S330 will be explained below with FIG. 4, FIG. 4 depicts a schematic diagram of control signal waveforms of the power management circuit 130 according to one embodiment of the present disclosure. As shown in FIG. 4, in detail, in step S320, in response to the first horizontal synchronizing signal Hsync, during the reset stage, the power management circuit 130 is configured to stop outputting the first operating voltage ELVDD. In some embodiments, when receiving a pulse wave of the first horizontal synchronizing signal Hsync, the power management circuit 130 will be configured to stop outputting the first operating voltage ELVDD after a first preset number of clock periods, which the first preset number of the clock periods can be written into a memory of the power management circuit 130 before leaving a factory, and this clock signal can be generated by the power management circuit 130 or an external circuit (for example, the display driving circuit 120). In some embodiments, the power management circuit 130 is configured to switch a pin that outputs the first operating voltage ELVDD to a high-impedance (High-Z) state to stop outputting the first operating voltage ELVDD. In this situation, the leakage current path 220 is disabled, and no leakage current is generated at this time, thereby achieving an effect of saving power consumption.

On the other hand, in step S330, in response to the first horizontal synchronizing signal Hsync, during the compensation stage, the power management circuit 130 is configured to increase the level of the first operating voltage ELVDD from a first level to a second level, and then lower back to the first level. This period of time is long enough to shorten a time for the gate terminal of the driving transistor DTFT to be charged to a target voltage. In some embodiments, when receiving the pulse wave of the first horizontal synchronizing signal Hsync, the power management circuit 130 will be configured to increase the level of the first operating voltage ELVDD from the first level to the second level after a second preset number of clock periods, which the second preset number of the clock periods can be written into the memory of the power management circuit 130 before leaving the factory. Therefore, it can save the time required to charge to the target voltage and help improve the refresh rate of the frame.

It should be noted that the method 300 may include more or fewer steps than shown in the flow chart, and the steps in the method 300 may be performed in any suitable order.

Figure 5:
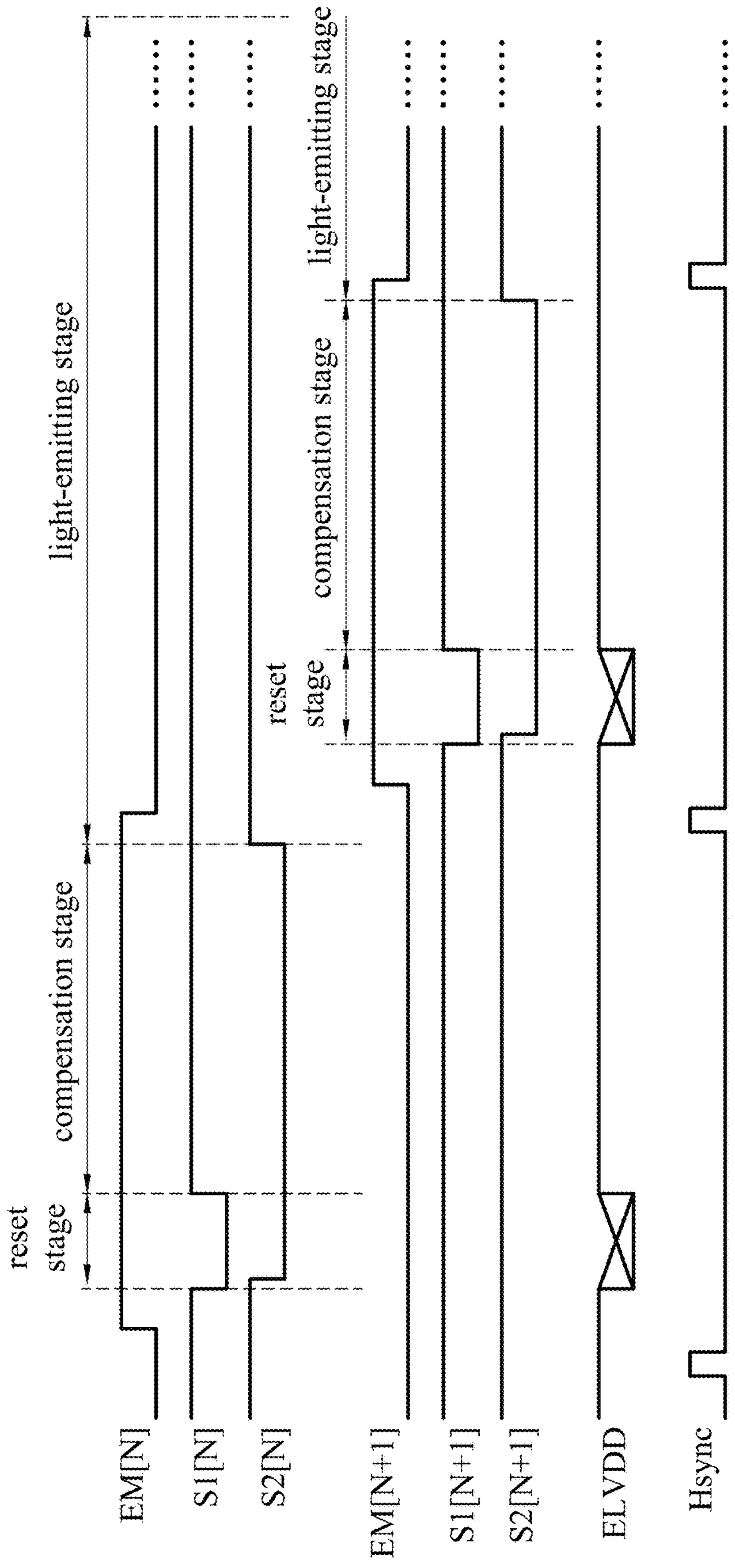
FIG. 5 depicts a schematic diagram of control signal waveforms of a power management circuit according to another embodiment of the present disclosure.

For example, the step S330 is omitted in the embodiment of FIG. 5. FIG. 5 depicts a schematic diagram of control signal waveforms of the power management circuit 130 according to another embodiment of the present disclosure. As shown in FIG. 5, in some embodiments, in response to the first horizontal synchronizing signal Hsync, the power management circuit 130 is only configured to stop outputting the first operating voltage ELVDD at the reset stage, and not to adjust the first operating voltage ELVDD at the compensation stage. In this way, an effect of disabling the leakage current path 220 can be achieved.

Figure 6:
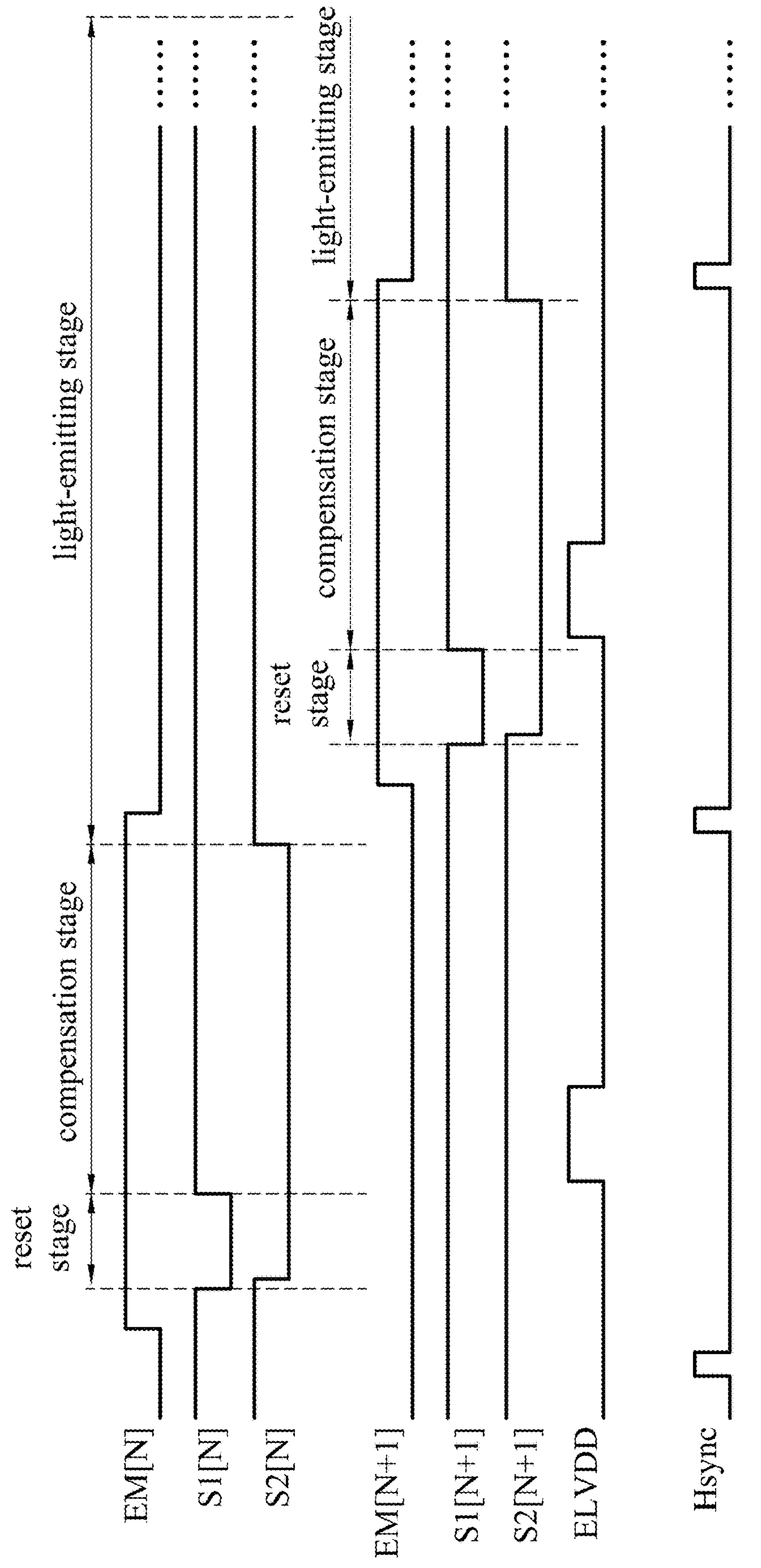
FIG. 6 depicts a schematic diagram of control signal waveforms of a power management circuit according to another embodiment of the present disclosure.

For another example, the step S320 is omitted in the embodiment of FIG. 6, FIG. 6 depicts a schematic diagram of control signal waveforms of the power management circuit 130 according to another embodiment of the present disclosure. As shown in FIG. 6, in some embodiments, in response to the first horizontal synchronizing signal Hsync, the power management circuit 130 is only configured to increase the level of the first operating voltage ELVDD from the first level to the second level for a period of time at the compensation stage, and not to adjust the first operating voltage ELVDD at the reset stage. In this way, an effect of saving the time required to charge to the target voltage can be achieved.

In some embodiments, in step S320, the power management circuit 130 is configured to maintain outputting the first operating voltage ELVDD, and to stop outputting the second operating voltage ELVSS at the reset stage. In another embodiments, in step S320, the power management circuit 130 is configured to stop outputting the first operating voltage ELVDD and the second operating voltage ELVSS simultaneously at the reset stage. In short, as long as an output of the at least one of the first operating voltage ELVDD and the second operating voltage ELVSS is stopped, the leakage current path 220 can be disabled to achieve an effect of saving power consumption.

In some embodiments, the power management circuit 130 is configured to maintain a voltage level of the first operating voltage ELVDD unchanged at the compensation stage, and reduce a voltage level of the second operating voltage ELVSS from a third voltage level to a fourth voltage level. In embodiments, the power management circuit 130 is configured to simultaneously increase the first operating voltage ELVDD and decrease the second operating voltage ELVSS at the compensation stage. In short, since increasing the first operating voltage ELVDD and/or decreasing the second operating voltage ELVSS can increase a difference between the voltage of the gate terminal of the driving transistor DTFT and the first operating voltage ELVDD and/or the second operating voltage ELVSS, an effect of saving the time required to charge or discharge to the target voltage can be achieved.

In summary, by providing the horizontal synchronizing signal to the display panel 110 and the power management circuit 130, the power management circuit 130 is configured to adjust the first operating voltage ELVDD and/or the second operating voltage ELVSS accordingly at the reset stage and the compensation stage in each frame in response to the horizontal synchronizing signal. Therefore, the display system 100 includes an advantage of saving power consumption and shortening a charging time of the gate terminal of the driving transistor DTFT to increase the refresh rate of the frame.

It should be noted that in some embodiments, the display driving circuit 120 is configured to receive a plurality of horizontal synchronizing signals. For example, the display driving circuit 120 is configured to receive aforementioned first horizontal synchronizing signal Hsync and additional second horizontal synchronizing signal (not shown in the figure), and transmit the first horizontal synchronizing signal Hsync and the second horizontal synchronizing signal to the power management circuit 130. The pixel circuits 200 in the display panel 110 are divides into a plurality of pixel circuit groups, which the pixel circuit groups include a first pixel circuit group and a second pixel circuit group. For example, the pixel circuits 200 located in odd columns of the pixel matrix are the first pixel circuit group, and the pixel circuits 200 located in even columns of the pixel matrix are the second pixel circuit group, but the present disclosure is not limited to this embodiment. The waveforms of the first horizontal synchronizing signal Hsync and the second horizontal synchronizing signal are arranged in time sequence, and the display driving circuit 120 is configured to control the display panel 110 according to the first horizontal synchronizing signal Hsync and the second horizontal synchronizing signal to update the first pixel circuit group and the second pixel circuit group respectively. In this situation, the power management circuit 130 is configured to adjust the first operating voltage ELVDD and/or the second operating voltage ELVSS in response to the first horizontal synchronizing signal Hsync and the second horizontal synchronizing signal. For example, the power management circuit 130 is configured to perform the aforementioned operating method 300 on the first pixel circuit group when receiving the pulse wave of the first horizontal synchronizing signal Hsync, and is configured to perform the aforementioned operating method 300 on the second pixel circuit group when receiving the pulse wave of the second horizontal synchronizing signal.

In other word, the power management circuit 130 is configured to adjust the first operating voltage ELVDD and/or the second operating voltage ELVSS to transmit the first pixel circuit group in a manner similar to the aforementioned operating method 300 according to the first horizontal synchronizing signal Hsync. The power management circuit 130 is configured to adjust the first operating voltage ELVDD and/or the second operating voltage ELVSS to transmit the second pixel circuit group in a manner similar to the aforementioned operating method 300 according to the second horizontal synchronizing signal. For the sake of brevity, and detail repetitious descriptions are omitted here.

It should be noted that a number of each of the horizontal synchronizing signal and the pixel circuit group is not limited to the aforementioned embodiment, the power management circuit 130 is configured to control the pixel circuit group corresponding to the horizontal synchronization signal according to the individual horizontal synchronization signal in a manner similar to the aforementioned operation method 300.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A display system, comprising:

a display panel, comprising a plurality of pixel circuits;

a display driving circuit, coupled to the display panel, and configured to receive a first horizontal synchronizing signal, wherein the display driving circuit is configured to transmit a data signal to the display panel according to the first horizontal synchronizing signal, wherein the data signal is configured to assign a grayscale value to each of the pixel circuits; and a power management circuit, coupled to the display driving circuit and the display panel, wherein the power management circuit is configured to provide a first operating voltage (ELVDD) and a second operating voltage (ELVSS) to the pixel circuits, wherein the first operating voltage is higher than the second operating voltage, wherein the display driving circuit is configured to transmit the first horizontal synchronizing signal to the power management circuit, the power management circuit is configured to adjust at least one of the first operating voltage (ELVDD) and the second operating voltage (ELVSS) in response to the first horizontal synchronizing signal.

2. The display system of claim 1, wherein the power management circuit is configured to stop outputting the at least one of the first operating voltage (ELVDD) and the second operating voltage (ELVSS) in response to the first horizontal synchronizing signal.

3. The display system of claim 2, wherein the display panel is configured to reset voltages of one or more internal nodes corresponding to each of the pixel circuits at a reset stage, wherein the power management circuit is configured to stop outputting the at least one of the first operating voltage (ELVDD) and the second operating voltage (ELVSS) in response to the first horizontal synchronizing signal at the reset stage.

4. The display system of claim 1, wherein the power management circuit is configured to increase a level of the first operating voltage (ELVDD) and/or reduce a level of the second operating voltage (ELVSS) in response to the first horizontal synchronizing signal.

5. The display system of claim 4, wherein each of the pixel circuits comprises a light emitting element and a driving transistor for driving the light emitting element, wherein the display panel is configured to control a plurality of corresponding pixel circuits to detect a threshold voltage of the driving transistor at a compensation stage, Wherein the power management circuit is configured to increase a level of the first operating voltage (ELVDD) and/or reduce a level of the second operating voltage (ELVSS) in response to the first horizontal synchronizing signal at the compensation stage.

6. The display system of claim 1, wherein the pixel circuits comprise a first pixel circuit group and a second pixel circuit group;

wherein the display driving circuit is further configured to receive a second horizontal synchronizing signal, and is configured to transmit the second horizontal synchronizing signal to the power management circuit, wherein the display driving circuit is configured to control the display panel to update the first pixel circuit group and the second pixel circuit group respectively according to the first horizontal synchronizing signal and the second horizontal synchronizing signal, wherein the power management circuit is further used for:

adjusting the at least one of the first operating voltage (ELVDD) and the second operating voltage (ELVSS) in response to the second horizontal synchronizing signal.

7. A power management circuit, configured to couple to a display panel and a display driving circuit, and configured to provide a first operating voltage (ELVDD) and a second operating voltage (ELVSS) to a plurality of pixel circuits of the display panel, wherein the first operating voltage is higher than the second operating voltage, wherein the power management circuit is further used for:

receiving a first horizontal synchronizing signal from the display driving circuit, wherein the display driving circuit is configured to transmit a data signal to the display panel according to the first horizontal synchronizing signal, wherein the data signals configured to assign a grayscale value to each of the pixel circuits; and adjusting at least one of the first operating voltage (ELVDD) and the second operating voltage (ELVSS) in response to the first horizontal synchronizing signal.

8. The power management circuit of claim 7, wherein the power management circuit is configured to stop outputting the at least one of the first operating voltage (ELVDD) and the second operating voltage (ELVSS) in response to the first horizontal synchronizing signal.

9. The power management circuit of claim 7, wherein the power management circuit is configured to increase a level of the first operating voltage (ELVDD) and/or reduce a level of the second operating voltage (ELVSS) in response to the first horizontal synchronizing signal.

10. The power management circuit of claim 7, wherein the pixel circuits are divided into a plurality of pixel circuit groups, wherein the pixel circuit groups comprise a first pixel circuit group and a second pixel circuit group;

wherein the power management circuit is further configured to receive a second horizontal synchronizing signal from the display driving circuit, wherein the display driving circuit is configured to control the display panel to update the first pixel circuit group and the second pixel circuit group respectively according to the first horizontal synchronizing signal and the second horizontal synchronizing signal, wherein the power management circuit is further configured to adjust the at least one of the first operating voltage (ELVDD) and the second operating voltage (ELVSS) in response to the second horizontal synchronizing signal.

11. An operating method, adapted for a power management circuit, wherein the power management circuit is configured to couple to a display panel and a display driving circuit, and is configured to provide a first operating voltage (ELVDD) and a second operating voltage (ELVSS) to a plurality of pixel circuits of the display panel, wherein the first operating voltage is higher than the second operating voltage, wherein the operating method comprises:

receiving a first horizontal synchronizing signal from the display driving circuit, wherein the display driving circuit is configured to transmit the first horizontal synchronizing signal to the display panel; and adjusting at least one of the first operating voltage (ELVDD) and the second operating voltage (ELVSS) in response to the first horizontal synchronizing signal.

12. The operating method of claim 11, wherein adjusting the at least one of the first operating voltage (ELVDD) and the second operating voltage (ELVSS) in response to the first horizontal synchronizing signal comprises:

stopping outputting the at least one of the first operating voltage (ELVDD) and the second operating voltage (ELVSS) in response to the first horizontal synchronizing signal.

13. The operating method of claim 12, wherein the display panel is configured to reset voltages of one or more internal nodes corresponding to each of the pixel circuits at a reset stage, wherein stopping outputting the at least one of the first operating voltage (ELVDD) and the second operating voltage (ELVSS) in response to the first horizontal synchronizing signal comprises:

stopping outputting the at least one of the first operating voltage (ELVDD) and the second operating voltage (ELVSS) in response to the first horizontal synchronizing signal at the reset stage.

14. The operating method of claim 11, wherein adjusting the at least one of the first operating voltage (ELVDD) and the second operating voltage (ELVSS) in response to the first horizontal synchronizing signal comprises:

raising a level of the first operating voltage (ELVDD) and/or reducing a level of the second operating voltage (ELVSS) in response to the first horizontal synchronizing signal.

15. The operating method of claim 14, wherein each of the pixel circuits comprises a light emitting element and a driving transistor for driving the light emitting element, wherein the display panel is configured to control corresponding ones of the pixel circuits to detect a threshold voltage of the driving transistor at a compensation stage, wherein raising the level of the first operating voltage (ELVDD) and/or reducing the level of the second operating voltage (ELVSS) in response to the first horizontal synchronizing signal comprises:

raising a level of the first operating voltage (ELVDD) and/or reducing a level of the second operating voltage (ELVSS) in response to the first horizontal synchronizing signal at the compensation stage.

16. The operating method of claim 11, wherein the pixel circuits are divided into a plurality of pixel circuit groups, wherein the pixel circuit groups comprise a first pixel circuit group and a second pixel circuit group;

wherein the power management circuit is further configured to receive a second horizontal synchronizing signal from the display driving circuit, wherein the display driving circuit is configured to control the display panel to update the first pixel circuit group and the second pixel circuit group respectively according to the first horizontal synchronizing signal and the second horizontal synchronizing signal, wherein the operating method further comprises:

adjusting the at least one of the first operating voltage (ELVDD) and the second operating voltage (ELVSS) in response to the second horizontal synchronizing signal.

* * * * *